US006743522B2

(12) United States Patent
Bean et al.

(10) Patent No.: US 6,743,522 B2
(45) Date of Patent: Jun. 1, 2004

(54) SELF HEAT SEALABLE PACKAGING AND A METHOD FOR MAKING SAME

(75) Inventors: Karen H. Bean, Cumming, GA (US); Bruce G. Stokes, Woodstock, GA (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 51 days.

(21) Appl. No.: 09/976,851

(22) Filed: Oct. 12, 2001

(65) Prior Publication Data

US 2002/0090474 A1 Jul. 11, 2002

Related U.S. Application Data

(60) Provisional application No. 60/249,120, filed on Nov. 16, 2000, and provisional application No. 60/240,184, filed on Oct. 13, 2000.

(51) Int. Cl.[7] .................. B32B 23/08; B32B 27/00; B32B 27/06; B32B 27/08; B32B 27/42
(52) U.S. Cl. .................. 428/500; 525/507; 525/509; 525/511; 525/512; 525/513; 525/514; 525/515
(58) Field of Search .................. 428/500, 507, 428/509, 511, 512, 513, 514, 515

(56) References Cited

U.S. PATENT DOCUMENTS

| | | | |
|---|---|---|---|
| 3,567,502 A | 3/1971 | Graham et al. | |
| 3,632,424 A | 1/1972 | Graham et al. | |
| 3,714,298 A | 1/1973 | Bergomi, Jr. | |
| 3,755,219 A | 8/1973 | Bergomi, Jr., et al. | |
| 3,991,881 A | 11/1976 | Augurt | |
| 4,109,043 A | * 8/1978 | DeLapp | 428/206 |
| 4,112,169 A | * 9/1978 | Huffman et al. | 428/206 |
| 4,128,696 A | * 12/1978 | Goebel et al. | 428/425.1 |
| 4,183,431 A | 1/1980 | Schmidt et al. | |
| 4,387,126 A | 6/1983 | Rebhotz | |
| 4,600,404 A | * 7/1986 | Sheldon et al. | 604/387 |
| 4,837,070 A | * 6/1989 | Weber et al. | 428/172 |
| 4,849,278 A | * 7/1989 | Stokes | 428/153 |
| 4,880,701 A | 11/1989 | Gibbons et al. | |
| 4,888,222 A | 12/1989 | Gibbons et al. | |
| 4,898,787 A | 2/1990 | Min et al. | |
| 4,921,733 A | 5/1990 | Gibbons et al. | |
| 5,063,104 A | * 11/1991 | Robertson et al. | 442/165 |
| 5,079,083 A | 1/1992 | Watkins et al. | |
| 5,128,182 A | 7/1992 | Bunker et al. | |
| 5,204,165 A | 4/1993 | Schortmann | |
| 5,217,772 A | 6/1993 | Brown et al. | |
| 5,225,256 A | 7/1993 | Marano et al. | |
| 5,330,845 A | 7/1994 | Andersson et al. | |
| 5,370,132 A | 12/1994 | Weber et al. | |
| 5,418,022 A | 5/1995 | Anderson et al. | |
| 5,441,056 A | 8/1995 | Weber et al. | |
| 5,466,336 A | 11/1995 | Kinsley, Jr. | |
| 5,466,518 A | 11/1995 | Isaac et al. | |
| 5,508,100 A | 4/1996 | Wierer et al. | |
| 5,576,364 A | 11/1996 | Isaac et al. | |
| 5,580,910 A | 12/1996 | Isaac et al. | |
| 5,595,828 A | 1/1997 | Weber et al. | |
| 5,622,786 A | 4/1997 | Weber et al. | |
| 5,733,824 A | 3/1998 | Brunka et al. | |
| 5,869,408 A | 2/1999 | Porter et al. | |
| 5,897,411 A | 4/1999 | Stark et al. | |
| 5,964,926 A | 10/1999 | Cohen | |

FOREIGN PATENT DOCUMENTS

| | | |
|---|---|---|
| WO | WO 98/24970 A | 6/1998 |
| WO | WO 99/00244 A | 1/1999 |
| WO | WO 99/00549 A | 1/1999 |
| WO | WO 99/48433 A | 9/1999 |

\* cited by examiner

*Primary Examiner*—Nathan M. Nutter
(74) *Attorney, Agent, or Firm*—Dority & Manning, P.A.

(57) ABSTRACT

The present invention is directed to saturants for fibrous webs that will confer upon those webs the ability to be heat sealed to many materials without compromising the drapability of the fibrous webs. The present invention is further directed to fibrous webs saturated with the saturant of the present invention and methods for saturating such webs. The invention is further directed to packages or containers comprising the saturated webs and methods of manufacturing such packages. The invention is further directed to temperature sensitive adhesive coatings that can be used with the saturated webs and a method for applying the coating.

15 Claims, No Drawings

SELF HEAT SEALABLE PACKAGING AND A METHOD FOR MAKING SAME

CLAIM OF PRIORITY

Priority is claimed to provisional Patent Application No. 60/249,120, filed Nov. 16, 2000 and to provisional Patent Application No. 60/240,184, filed Oct. 13, 2000.

TECHNICAL FIELD

The present invention is directed to saturants for fibrous webs. The present invention is further directed to saturated fibrous webs and methods for saturating such webs. The invention is further directed to packages or containers comprising the saturated webs and methods of manufacturing such packages. Such packages have particular utility for the medical field, including packaging for medical instruments and other devices that require sterilization. The invention is further directed to coatings used with the saturated webs, a method for applying the coatings. The invention is further directed to fibrous webs coated with such coatings and articles comprising such webs.

BACKGROUND OF THE INVENTION

Many products, especially devices and supplies used in surgical and other medical applications, must be sterilized prior to use. Examples of such products in the medical context include but are not limited to surgical devices, implants, tubing, valves, gauzing, syringes, and protective clothing such as surgical gowns and gloves. Such products and supplies are often packaged prior to being sterilized. One sterilization procedure for such products involves using sterilizing gases that will penetrate pores in the packaging. Steam and ethylene oxide are examples of such sterilizing gases. The gas flows through the pores in the packaging material and sterilizes the instruments contained therein. Over time, the gas will then diffuse out of the package. The packaging serves to protect the instruments during sterilization and to preserve their sterility upon subsequent storage until the packages are opened for use of the product. To allow proper sterilization, packaging for medical products should be sufficiently permeable to sterilization gases to allow the gases to sterilize the product within. To avoid contamination after sterilization, the packaging should also prevent the entry of bacteria and pathogens into the package.

Packaging for many medical and sterile supplies includes two components, referred to herein as the base component and the breathable cover. The two components are attached to one another to form such structures as a pouch, which combines two flexible layers, or a rigid container, which uses a rigid base component often in the form of a tub or tray with the breathable cover acting as a lid. The sterile devices are stored between the two layers in a pouch or within the tub, tray, or other space within the rigid base component in a rigid container. The package is completed by sealing the two layers together, often by heating the materials so that a seal is formed using a temperature sensitive adhesive. When the device contained in the package is needed, the package is opened. Such packages are opened commonly and desirably by pulling the two components apart along the seal. Examples of such packages are widely known and include: U.S. Pat. No. 3,991,881 to Augurt, U.S. Pat. No. 4,183,431 to Schmidt et al.; U.S. Pat. No. 5,217,772 to Brown et al.; and U.S. Pat. No. 5,418,022 to Anderson et al.

Seals between components of a package must have sufficient strength to assure that stresses resulting from package handling after assembly will not cause the seal to open before the desired time and will remain impervious to pathogens. Seal strength is commonly expressed as the force required to separate the two sealed layers when holding the layers at facing edges and pulling the layers in opposite directions, commonly referred to as a "T-peel" because peeling results in the two separated portions of the layers forming the arms of the letter "T" with the base of the letter "T" being the portion of the two layers that remain attached until pulled apart. One method used to evaluate seal strength using a "T-peel" is found in American Society of Testing and Materials (ASTM) method F904-98. Other methods for testing seal strength exist, some of which are based on this ASTM method. Many users of such packages specify that the seal have a minimum strength of 0.70 pounds per inch in a T-peel test. Accordingly, seal strengths that are at least about 0.70 pounds per inch are especially desirable. In some applications, the seal strength desirably is not so great that one or more of the package components will tear before the seal opens. A desirable seal strength in such applications is thus greater than 0.70 pounds per inch but lower than a value that would result in tearing of one or more of the package components upon opening.

The base component in this type of package should be impervious to bacteria and other pathogens. Typical materials used in making base components include, but are not limited to, such polymers as nylon, polyester, polypropylene, polyethylene and polystyrene. Of these materials, nylon, polyester, polyethylene (including but not limited to low density, linear low density, ultra low density and high density polyethylene), and polypropylene are particularly useful for flexible base components. Polyester, polyethylene (including but not limited to high density polyethylene), polypropylene, and polystyrene are examples of polymers that are particularly useful for rigid containers such as tubs or trays. Those skilled in the art will recognize that the preceding lists of base components and materials used in making base components are for illustration purposes only and are not meant to be exclusive.

The breathable cover is typically a nonwoven web, which is a sheet comprised of cellulose fibers, synthetic fibers, or a combination thereof. Different materials, including some fabrics, have been used to form breathable covers for use in medical supply packaging. (As used herein, the term "fabric" is intended to encompass any sheet-like or web material that is formed in whole or in part from a plurality of fibers). One such material comprises webs of polyolefin fibers such as the spunbonded polyolefin material sold under the trademark TYVEK® by E.I. Du Pont De Nemours & Co. Others are webs comprising cellulose fibers or papers that have been saturated with one or more polymers such as acrylates to impart certain qualities to the paper. Such polymer reinforcement improves one or more of dimensional stability, resistance to chemical and environmental degradation, resistance to tearing, embossability, resiliency, conformability, moisture vapor transmission, and abrasion resistance, among others. In addition, saturation of paper-based webs by such emulsions ties down the cellulose fibers so that particulate generation is reduced when the fabric is torn or peeled. Polymer saturated papers provide certain advantages over polyolefin webs. Webs made from polyolefins often lack the suppleness, softness, and drapability that polymer saturated papers may possess. Use of cellulose webs is also a less expensive alternative to the polyolefin webs.

The polymer is normally applied by a saturation process, which involves dipping the formed fabric web into a bath of emulsion or subjecting the fabric web to an emulsion-flooded nip. Alternatively, the webs may be subjected to polymer impregnation while still on the forming wire through the use of various emulsion processes and the like. Polymer impregnation may also occur prior to forming the web as described in International Publication Number WO 99/00549 to Deka, et. al. Processes in which polymer is applied to a formed web are generally referred to herein as "latex saturation" processes. The term "latex" as used herein refers to a synthetic polymer emulsion. Processes in which polymer is applied to the fibers before the web is formed are generally referred to herein as "wet end deposition," the term "wet end" referring to the section of the paper machine.

Examples of latex-saturated substrates include products designated as BP 336 and BP 321 that are available from Kimberly-Clark Corporation. These products are base papers that may be used as medical packaging substrates and comprise various amounts of cellulosic pulps and synthetic latex.

In addition to being permeable to sterilizing gases and relatively impermeable to bacteria, the fibrous webs should be strong and should exhibit relatively high internal bonding, or delamination and tear resistance. Surgical instruments and trays containing various surgical instruments are often sterilized while wrapped in the medical packaging substrates. After sterilization, the storage containers may then be placed on shelves in a storage facility for later transportation to the operating room. Because such storage and transportation may involve the bumping or rubbing of the storage containers against one another, the medical packaging substrates must be strong enough to withstand such handling.

In addition, fibrous webs may also possess a certain degree of fluid repellency to prevent further transmission of the bacteria. It is often desired that medical packaging substrate be non-toxic, odorless, lint-free, drapable, supple, smooth, etc. The need for such "touch and feel" characteristics depends on the particular product for which the bacteria barrier fabric is to be used.

Fibrous web packaging substrates may be formed from either cellulosic fibers alone, synthetic polymeric fibers alone, or a combination of both cellulosic and synthetic fibers. For example, U.S. Pat. No. 5,204,165 to Schortmann discloses a nonwoven laminate having barrier properties that is described as being suitable for industrial, hospital, and other protective or covering uses. The laminate consists of at least one thermoplastic fiber layer bonded with a wet-laid fabric layer made from a uniform distribution of cellulose fibers, polymeric fibers, and a binder. In one embodiment, spunbond polyester fiber layers are ultrasonically bonded on each side of a wet-laid barrier fabric made of eucalyptus fibers and polyester fibers. The barrier fabric is bonded with an acrylic latex binder. The binder is added to the formed polymeric/cellulosic web after the web is formed. The binder may be added by any one of several methods, including foamed emulsion, gravure roll polymer emulsion, spraying, padding and nip-pressure binder pick-up. Schortmann is an example of a barrier fabric formed using a latex saturation process.

Another process for saturating a formed web with a latex binder is disclosed in U.S. Pat. No. 5,595,828 to Weber. A polymer-reinforced paper, which includes eucalyptus fibers, is disclosed. After forming the web from eucalyptus fibers and, optionally, other fibers such as non-eucalyptus cellulosic fibers and/or synthetic fibers, the web is saturated with a latex binder.

Various latex emulsions have been used as binder materials for paper-based webs as well as coating materials for nonwoven webs. Polymeric emulsions of acrylates, polymethacrylates, poly(acrylic acid), poly(methacrylic acid), and copolymers of the various acrylate and methacrylate esters and the free acids; styrene-butadiene copolymers; ethylene-vinyl acetate copolymers; nitrile rubbers or acrylonitrile-butadiene copolymers; poly(vinyl chloride); poly(vinyl acetate); ethylene-acrylate copolymers; vinyl acetate-acrylate copolymers; neoprene rubbers or trans-1,4-polychloroprenes; cis-1,4-polyisoprenes; butadiene rubbers or cis- and trans-1,4-polybutadienes; and ethylene-propylene copolymers have been used to saturate paper-based webs in order to enhance strength and delamination resistance.

Latexes have also been used as barrier coatings to form fluid impervious webs. For example, in U.S. Pat. Nos. 5,370,132 and 5,441,056 to Weber et al. a nonwoven material's surface is first treated with a repellent coating material such as a fluorocarbon. The treated surface is then coated with a barrier coating which may be one of the various latex emulsions. Unlike a saturated web which will have latex particles throughout the web, the described webs in the Weber et al. patent have a surface barrier coating comprising a latex or other barrier material.

Although many latex-saturated webs perform well enough to function as medical packaging barrier substrates, saturating a cellulose paper web with a polymer emulsion to obtain the necessary strength typically results in reduced barrier efficacy. It is possible to improve barrier by refining the pulp as part of the papermaking process. Refining can be described as a grinding action that separates the pulp into individual fibers and works to free the outer fibrils from the surface of the fiber. This action creates more sites on the fiber for bonding with other fibers and thereby increases the tensile strength and delamination resistance of the web. Refining also reduces the size of open passages through the sheet and thus decreases the porosity or permeability of the sheet. Refinement techniques are well documented in the art and the relationship between parameters of refinement processes and the desired characteristics of resulting webs is well known to persons skilled in the art. One disadvantage of using highly refined webs, however, is that refining tends to reduce the tear resistance of a web. Despite the availability of several alternative bacteria barrier fabrics, a need still exists for further improved medical substrates that can be used in forming bacteria barrier packages.

A disadvantage of using polymer saturated paper as the breathable cover is the absence in the art of a saturant that will confer upon the paper the ability to form a strong adhesive bond with the base components through heat sealing without compromising drapability of the paper. Heat sealing refers broadly to any process involving the creation of an adhesive seal between two objects through the application of heat, often with pressure. In many applications the base component and breathable cover are attached by heat sealing. Some base components are comprised of polymers capable of forming bonds with other polymeric materials by means of heat sealing. Other base components are extruded or coated with an outer layer comprising heat sealable polymers. Examples of polymeric materials found in base components that have such strong sealability include, but are not limited to polypropylene, polyethylene, (including but not limited to low density, linear low density, and ultra low density polyethylene.), various copolymers of vinyl acetate (including, but not limited to, low and high vinyl acetate compositions of ethylene vinyl acetate) and ethylene acrylic acid. Because many polyolefin webs contain polymeric material that forms strong heat seals with materials used in base components, such webs can be heat sealed to base components, often eliminating the need for applying an adhesive coating to the surface of the breathable cover. By contrast, many polymers used to saturate papers for use as breathable covers lack sufficient affinity for heat sealing to materials used in base components and thus cannot form as strong of a bond without the use of a temperature sensitive adhesive coating.

A saturated paper that can form a sufficiently strong bond to the base component through heat sealing could in many cases eliminate the need to coat the saturated paper altogether. Allowing the saturated paper to bond directly to the base component will result in a seal that involves only one interface of different materials rather than two interfaces on either side of the sealant. Eliminating one of the interfaces reduces the potential for seal failure. In addition, removing the coating step would reduce the potential for departures from product specifications due to errors in that step of the process. Examples of production errors associated with coating include "skip coating," in which the coating is not applied to an entire surface, or the formation of pinholes in the coating. Eliminating the use of the coating and the coating production step would also result in cost savings.

There have been some efforts to develop papers that can be sealed to base components containing heat sealable polymeric materials by impregnating papers with heat sealable polymeric materials. For example, International Publication Number WO 98/24970 to Cohen et al. teaches impregnating papers with a polymer emulsion primarily for the purpose of improving strength. Cohen et al. discusses heat sealability of the impregnated papers and includes examples that involve impregnating paper with ethylene acrylic acid and polyethylene, two heat sealable saturant materials.

In practice, however, saturating paper with heat sealable polymeric materials has resulted in webs that have less than desirable drapability for packages containing some medical products. "Drapability" refers essentially to flexibility and absence of stiffness in a fibrous web. Sufficient drapability allows a web to conform to the contours of the products contained in the package and thus to assure a higher degree of contact between the web and the surface area of the product. A softer, more drapable web is less brittle and more flexible and would therefore provide for easier handling of flexible packages with less potential for puncture or tear. Coatings applied to saturated papers in the past have served not only to promote heat sealing but also to enhance the paper's function as a barrier to pathogen contamination. Even for a saturant that forms stronger bonds when heat sealed, there may be a need for a temperature sensitive adhesive coating that is compatible with the saturant for use in some applications in which it is desirable to increase the seal strength further, to improve barrier properties, or both. What is needed in the art therefore is a saturant that may be used to confer heat sealability on a paper without compromising the drapability of saturated paper. A paper saturated with such a saturant could be sealed without the need for an adhesive coating and would have utility for medical products and other products for which drapable heat sealable packaging is desired. In the event that a need to use the paper along with a coating is found to exist, there will be a further need in the art for a coating that is compatible with the saturated paper.

What is further needed in the art are substrates that readily allow sterilization materials to enter into the package and sterilize the enclosed appliances while at the same time exhibiting sufficient strength, at least in terms of delamination and tear resistance, to function as medical packaging. In particular, a need exists for maintaining the barrier efficacy of latex-saturated webs without hindering the enhanced strength of these webs resulting from latex-saturation without additional refinement. Any webs that allow for sufficient amounts of latex add-on without decreasing barrier efficacy would be improvements over known latex-saturated substrates used as medical packaging.

SUMMARY OF THE INVENTION

The present invention is directed to a saturant for fibrous webs, or papers, that can be used to confer upon a fibrous web an increased seal strength when heat sealed to a base component, as compared to other acrylic polymer saturants, while still allowing the web to retain its drapability as well is its porosity to sterilization gases and ability to function as a barrier to pathogens characteristic of papers saturated with acrylic polymer emulsions. The saturant combines a heat sealable polymeric material with other saturant polymeric materials that are not heat sealable but that improve the drapability of the saturated paper.

The present invention is further directed to a fibrous web that is saturated with the saturant of the present invention and a method for saturating the fibrous web with the saturant. The present invention is further directed to packaging using the saturated fibrous web and a method of manufacturing the packaging.

While the saturant of the present invention eliminates the need to apply a coating to fibrous webs in many applications, the invention further relates to a coating containing heat sealable polymeric materials that can be used with the saturated paper of the present invention, if desired to enhance further the paper's seal strength or its function as a barrier to bacteria and other pathogens. Accordingly, the present invention is further directed to a temperature sensitive adhesive coating that can be used with the saturated fibrous web of the present invention.

The present invention is also directed to saturated papers that overcome some of the shortcomings of the prior art by providing a sufficiently strong latex-saturated paper-based web that also exhibits adequate bacteria barrier efficacy to be used for improved medical packaging applications. The use of a particular type of latex as the saturant provides the effective range of bacteria filtration while at the same time allowing the web to maintain its enhanced strength and delamination resistance that are required when such substrates are employed to wrap surgical trays, surgical instruments, medical appliances and the like prior to sterilization.

This aspect of the invention consists of a paper-containing medical packaging substrate that has been saturated with a latex having a glass transition temperature of −20° C. or less. Examples of such latex emulsions are certain acrylic latexes sold under the trade name HYSTRETCH® by Noveon, Inc. Cleveland, Ohio. In particular, three known acrylic latex saturants that meet these characteristics are HYSTRETCH® V-29, HYSTRETCH® V-43, and HYSTRETCH® V-60. The "V-29", "V-43", and "V-60" designations represent the glass transition temperatures of the particular latexes. Thus, HYSTRETCH® V-29 has a glass transition temperature of −29° C.; HYSTRETCH® V-43 has a glass transition temperature of −43° C.; and HYSTRETCH® V-60 has a glass transition temperature of −60° C. and are examples of the latexes that provide the required attributes of the present invention.

These and other features and advantages of the present invention will become apparent after a review of the following detailed description of the disclosed embodiments and the appended claims.

DETAILED DESCRIPTION OF THE INVENTION

Definitions

The following definitions apply throughout this application.

The term "acrylate," "acrylic polymer" and "acrylic latex," as described herein, each refer to homopolymers and heteropolymers of acrylate esters and methacrylate esters.

The term "base component material" is defined broadly to include any chemical or substance contained in a base component of a package that is capable of forming heat seals with one or more polymers. Examples include, but are not limited to polypropylene, polyethylene, (including but not limited to low density, linear low density, and ultra low density polyethylene.), various copolymers of vinyl acetate (including, but not limited to, low and high vinyl acetate compositions of ethylene vinyl acetate) and ethylene acrylic acid.

The term "seal strength" when used in connection with a fibrous web saturated with a given saturant shall refer to the strength of a seal between a fibrous web and a base component as determined by a T-peel test using ASTM method F904-98 with the following changes: sample width is 15 mm, jaw travel is 125 millimeters at a rate of 300 millimeters per minute.

The term "enhanced seal strength," when used in connection with a saturant that comprises both a drapable saturant component and an additional saturant polymer, refers to the fact that the saturant confers a seal strength upon a seal between a fibrous web saturated with the saturant and a specific base component comprising a specific base component material that is higher than the seal strength of a seal made under identical sealing conditions between an identical base component and a fibrous web saturated under identical saturating conditions and having an identical composition except that it comprises the drapable saturant component without the additional saturant polymer. The term "significantly enhanced seal strength," when used in connection with a saturant that comprises both a drapable saturant component and an additional saturant polymer, refers to the fact that the saturant confers a seal strength upon a seal between a fibrous web saturated with the saturant and a specific base component comprising a specific base component material that is at least about twice as strong as the seal strength of a seal made under identical sealing conditions between an identical base component and a fibrous web saturated under identical conditions and having an identical composition except that it comprises the drapable saturant component without the additional saturant polymer.

The term "degree of enhanced seal strength," when used in connection with a saturant that comprises both a drapable saturant component and an additional saturant polymer, refers to the amount by which the seal strength of a seal between a fibrous web saturated with the saturant and a specific base component comprising a specific base component material is higher than the seal strength of a seal made under identical sealing conditions between an identical base component and a fibrous web saturated under identical conditions and having an identical composition except that the saturant comprises the drapable saturant component without the additional saturant polymer.

The term "drapable saturant component" means a polymer that, when applied as a saturant to a fibrous web without other polymers, results in a web with a Gurley stiffness of less than about 165, expressed in milligrams. Examples of saturant polymeric materials include, but are not limited to, acrylic polymers, nitrile copolymers, and copolymers of butadiene and styrene. It has been found that polymers with glass transition temperatures less than 10° C. generally provide for a more drapable web than higher glass transition temperature polymers. Examples of such acrylic polymers include HYCAR® 26083, 26703 (a formaldehyde-free version of HYCAR® 26083), 26469, and 26322 available from Noveon, Inc., RHOPLEX® B-15J available from Rohm & Haas, and FLEXBOND® 274 from Air Products and Chemicals, Inc. Examples of nitrile copolymers include TYLAC® 68513-00, available from Reichhold, and HYCAR® 1562, available from Noveon, Inc. An example of a butadiene-styrene copolymer is GOOD-RITE® SB1168 available from Noveon, Inc. The examples provided are not intended to be exhaustive. Persons of ordinary skill in the art will recognize that embodiments including other polymers are possible and the present invention is not limited to any particular polymer or relative concentration. It was observed, however, that use of a drapable saturant component with a glass transition temperature of about 10° C. or lower resulted in a saturated paper with improved flexibility and drapability as compared to saturants with higher glass transition temperatures. One desirable embodiment is the use of an acrylate such as RHOPLEX® B-15J with a glass transition temperature of −5° C. Still another desirable embodiment uses an acrylic polymer such as HYCAR® 26703 or 26083 with a glass transition temperature of −15° C.

The term "Gurley stiffness" means stiffness determined by TAPPI method T543om-00.

The term "Persoz hardness" or "Rocker hardness" means hardness determined by Test Method B of American Society for Testing and Material (ASTM) Method No. D4366-95.

With respect to above definitions that relate to seal strength and changes in seal strength, persons skilled in the art will also recognize that other factors besides the saturant composition affect the seal strength between a saturated fibrous web and a base component. Such factors include the type of base component material, the amount of base component material present in the base component, and, if the base component material is limited to a coating or outer layer on the base component, the thickness of the coating or outer layer. In addition, conditions under which a heat seal was made can affect sealability, specifically sealing temperature, amount of pressure applied, and duration of exposure to heat and pressure. For purposes of these definitions, however, it is assumed that all conditions regarding saturant composition, base component material composition, and saturant and sealing conditions are unchanged, with the exception of the presence or absence of the additional saturant polymer.

Heat-Sealable Saturated Fibrous Webs

The present invention is directed to a composition used as a saturant for fibrous webs, such as papers, that will confer enhanced seal strength upon the fibrous webs when sealed to base component materials. The invention is further directed to saturants that will provide fibrous webs with a seal strength of at least about 0.70 lb/in. The invention is further directed to the saturated papers and a method for saturating them. The invention is further directed to packaging that includes the saturated papers and a method for making the package. Finally, the invention is directed to a temperature sensitive adhesive coating that can be used with the saturated papers.

Saturant Compositions

The composition of this aspect of the present invention includes a blend of at least two polymeric materials. One of the polymers is a heat sealable polymeric material that will confer upon the paper the ability to be heat sealed to a base component that contains heat sealable polymeric material. Examples of heat sealable polymeric materials that may be used in the saturant of the present invention include, but are not limited to, homopolymers and heteropolymers of lower alkenes. The term "lower alkenes" means ethylenes and/or propylenes. Examples of heat sealable polymers include but are not limited to polyethylene, polypropylene, ethylene acrylic acid and ethylene vinyl acetate. Desirable heat sealable saturant polymers include polyethylene and ethylene acrylic acid. An especially desirable heat sealable polymer is ethylene acrylic acid. An example of commercially available ethylene acrylic acid is MICHEM® Prime 4983R, available from Michelman, Inc. MICHEM® Prime 4983R is a dispersion of Dow PRIMACOR® 5980I, a copolymer of ethylene and acrylic acid that has an ethylene content of approximately 80%. An example of a commercially available polyethylene is MICROTHENE® F FN501-11, a dispersible powder available from Equistar Chemicals L.P.

The other polymer in the saturant is the drapable saturant component. This component helps assure the softness, drapability, and flexibility of the saturated sheet. In one desirable embodiment the drapability, as measured by Gurley stiffness, is less than about 165 milligrams in the machine direction. In another desirable embodiment the drapability, as measured by Gurley stiffness, is less than about 155 milligrams in the machine direction. In another desirable embodiment the drapability, as measured by Gurley stiffness, is less than about 145 milligrams measured in the machine direction. In another desirable embodiment the drapability, as measured by Gurley stiffness, is less than about 100 milligrams measured in the cross direction. In another desirable embodiment the drapability, as measured by Gurley stiffness, is less than about 95 milligrams measured in the cross direction. In another desirable embodiment the drapability, as measured by Persoz hardness, is less than about 70 seconds (mean value). In another desirable embodiment the drapability, as measured by Persoz hardness, is less than about 65 seconds (mean value). In another desirable embodiment the drapability, as measured by Persoz hardness, is less than about 55 seconds (mean value).

The saturant provides fibrous webs with enhanced seal strength. In one desirable embodiment, the webs exhibit a significantly enhanced seal strength. In another desirable embodiment, the degree of enhanced seal strength is at least a ten-fold increase. In another desirable embodiment, the degree of enhanced seal strength is at least a twenty-fold increase. In another desirable embodiment, the seal strength is 0.70 lb/in. or greater but lower than a value that would result in tearing of one or more of the package components upon opening; that is, lower than the internal bond strength of either the reinforced web or the base component. Saturants that provide fibrous webs with seal strengths of at least about 0.70 lb/in are also within the present invention, regardless of whether such saturants involve an "enhanced seal strength" or a "significantly enhanced seal strength" as compared to another saturant.

Saturant compositions may also include additives that provide the saturant or the saturated web with desirable qualities. By way of example and not an exclusive list, antifoaming agents, chemicals for pH adjustment, pigments, processing aids, and dispersing agents are among the possible additives. Examples of antifoaming agents include, but are not limited to, products such as NALCO® 7518 available from Nalco Chemical Company or DOW CORNING® Antifoam available from Dow Corning Corporation. Chemicals used to adjust pH include, but are not limited to, ammonia, sodium hydroxide, potassium hydroxide, hydrochloric acid, acetic acid, and sulfuric acid. Dispersing agents or surfactants include, but are not limited to, products such as TAMOL® 731A available from Rohm & Haas Co., PLURONIC® F108 available from BASF Corporation, SMA® 1440 Resin available from ATOFINA Chemicals, Inc., and TERGITOL® 15S available from Union Carbide Corp. Examples of processing aids may include, but are not limited to, products such as NOPCOTE® DC-100A available from Geo Specialty Chemicals, Inc. SCRIPSET® 540 available from Solutia, Inc. and AQUAPEL® 752 available from Hercules Incorporated. Examples of pigments used to increase opacity include but are not limited to, titanium dioxide such as TI-PURE® Rutile Titanium Dioxide available from E.I. DuPont De Nemours & Co. and kaolin pigments, which are available from a variety of manufacturers. A wide range of pigments and dyes may also be added to impart color to the saturated sheet. The foregoing list of categories of additives and examples of categories is provided by way of example and is not intended to be exhaustive. Embodiments including other additives are possible and the present invention is not limited to any particular set of additives or relative concentrations.

Persons skilled in the art will recognize that the amount of each component used in the composition may vary depending on factors such as the desired use of the composition and the components to be used in the composition, among others. For example, the composition of processing aids, chemicals for pH adjustment, and dispersing agents may be varied to improve process conditions during production. Adjusting pH, for example, can assist in controlling viscosity of the saturant. Dispersing agents may be used, for example, to improve the dispersion of a pigment in the saturant. Additionally, product specifications such as opacity and wet strength may dictate the composition of the saturant.

Saturated Fibrous Webs

Since the invention is also directed toward saturated papers, the paper or fibrous web to be used is also a component of the invention. Such webs are generally prepared by any of a variety of well known methods for air laying or wet laying fibers to form the web. The fibers may include cellulose fibers alone or in combination with synthetic fibers.

Sources of cellulose fibers include, by way of example and not by way of limitation, woods, such as softwoods and hardwoods; straws and grasses, such as rice, esparto, wheat, rye, and sabai; canes and reeds, such as bagasse; bamboos; woody stalks, such as jute, flax, kenaf, and cannabis; bast, such as linen and ramie; leaves, such as abaca and sisal; and seeds, such as cotton and cotton linters. Softwoods and hardwoods are the more commonly used sources of cellulose fibers; the fibers may be obtained by any of the commonly used pulping processes, such as mechanical, chemimechanical, semichemical, and chemical processes. Examples of softwoods include, by way of illustration only, longleaf pine, shortleaf pine, loblolly pine, slash pine, Southern pine, black spruce, white spruce, jack pine, balsam fir, douglas fir, western hemlock, redwood, and red cedar. Examples of hardwoods include, again by way of illustration only, aspen, birch, beech, oak, maple, eucalyptus, and gum. Softwood and hardwood Kraft pulps generally are desirable for toughness and tear strength, but other pulps, such as recycled fibers, sulfite pulp, and the like may be used, depending upon the application. Cellulose fibers may also be bleached to whiten the pulp fibers using various chemical processes.

Different cellulose fibers provide different attributes to the finished web. The choice of fiber sources is dependent on the final application of the web. For example, softwood fibers are often included in a web to increase tensile strength. Hardwood fibers may be selected for their ability to improve formation, a term referring to the uniformity in distribution of the fibers. In one desirable embodiment, the paper contains between about 30% and about 75% eucalyptus fibers based on total dry weight of the fibers. In another desirable embodiment, the paper contains between about 50% and about 75% eucalyptus fibers based on total fiber dry weight. Other fibers in those embodiments include northern softwood fibers, either alone or in combination with synthetic fibers.

In accordance with this aspect of the present invention, any of the various wood and nonwood pulps and other cellulosic fibers may be incorporated into the pulp furnish. Illustrative examples of suitable lignocellulosic pulps include southern pines, northern softwood pulps, red cedar, hemlock, black spruce and mixtures thereof. Examples of high-average fiber length wood pulps include those available under the trade designations LL19 available from Kimberly-Clark Corporation and INTERNATIONAL PINE® available from International Paper Company. Other various cellulosic fibers that may be used in the present invention include eucalyptus fibers, such as Primacell Eucalyptus, available from Klabin Riocell, and other hardwood pulp fibers available under the trade designations LL16 available from Kimberly-Clark Corporation, St. Croix hardwood available from Georgia-Pacific Corporation, and Leaf River hardwood available from Georgia-Pacific Corporation. Other cellulosic fibers may be utilized in the present invention, depending on the particular characteristics desired.

Refinement of the pulp may be conducted in order to improve the properties necessary to use the web as a bacteria barrier. In particular, refinement of the pulp may be carried out by beating or otherwise agitating the cellulosic material until the material is sufficiently separated into relatively individual pulp fibers. Such refinement may be carried out by any number of various known methods such as in commercial grade pulp refiners. Such refining processes are within the known skill in the art and often improve the bacteria filtration efficiencies of webs made from highly refined pulp.

The pulp of the invention may be a mixture of different types and/or qualities of pulp fibers. For example, the invention may include a pulp containing more than about 50 percent by weight, low-average fiber length pulp and less than about 50 percent by weight, high-average fiber length pulp (e.g., virgin softwood pulp). The low-average fiber length pulp may be characterized as having an average fiber length of less than about 1.2 mm. For example, the low-average fiber length pulp may have a fiber length of from about 0.7 mm to about 1.2 mm. The high-average fiber length pulp may be characterized as having an average fiber length of greater than about 1.5 mm. For example, the high-average fiber length pulp may have an average fiber length of from about 1.5 mm to about 6 mm. The fiber mixture may contain about 75 percent, by weight, low-average fiber length pulp and about 25 percent, by weight, high-average fiber length pulp.

The low-average fiber length pulp may be certain grades of virgin hardwood pulp and secondary (i.e., recycled) fiber pulp from sources such as, for example, newsprint, reclaimed paperboard, and office waste. The high-average fiber length pulp may be bleached and/or unbleached virgin softwood pulps.

Types of synthetic fibers commonly used include, by way of example and not by way of limitation, polymers comprised of rayon, polyvinyl alcohol, alcohol copolymers, polyesters, polyamides, polyolefins, copolymers, and blends thereof. Examples of polyesters include, but are not limited to, polyethylene terephthalate, polybutylene terephthalate, polytetramethylene terephthalate, polycyclohexylene-1,4-dimethylene terephthalate, and isophthalate copolymers thereof. Examples of polyamides include, but are not limited to, nylon 6, nylon 6/6, nylon 4/6, nylon 11, nylon 12, nylon 6/10, and nylon 12/12. Examples of polyolefins include, but are not limited to, polyethylenes (including but not limited to high density polyethylene, medium density polyethylene, low density polyethylene, ultra low density polyethylene, linear low density polyethylene and others), polypropylenes (including but not limited to isotactic polypropylene, atactic polypropylene, syndiotactic polypropylene, blends of the foregoing, and others), polybutylenes, (including but not limited to poly(1-butene), and poly(2-butene), polypentenes, (including but not limited to poly(1-pentene), poly(2-pentene), poly(3-methyl-1-pentene); and poly(4-methyl-1-pentene)) and copolymers and blends thereof. Suitable copolymers include random and block copolymers prepared from two or more different unsaturated olefin monomers, such as ethylene/propylene and ethylene/butylene copolymers. Of these suitable polymers, more desirable polymers are polyolefins, most desirably polyethylene and polypropylene, because of their commercial availability, as well as their chemical and mechanical properties. Those skilled in the art will recognize that the preceding list is not exclusive and that blends or copolymers of different polymers may be used. In addition, fibers that combine different polymer fibers in a multicomponent configuration may also be considered for use as a synthetic fiber. One example of a multicomponent fiber is comprised of two fibers having differing characteristics combined into a single fiber, commonly called a bicomponent fiber. Bicomponent fibers generally have a core and sheath structure where the core polymer has a higher melting point than the sheath polymer. Other bicomponent fiber structures, however, may also be utilized. For example, bicomponent fibers may be formed with the two components residing in various side-by-side relationships as well as concentric and eccentric core and sheath configurations. One particular example of a suitable bicomponent fiber is sold under the name CELBOND® T255 by KoSa. CELBOND® T255 is a synthetic polyester/polyethylene bicomponent fiber that is capable of adhering to cellulosic fibers when its outer sheath is melted at a temperature of approximately 128° C.

The purpose of including synthetic fibers in papers is to impart tear resistance to the sheets. Adding synthetic fibers, however, can also reduce the web's resistance to delamination. Including synthetic fibers in a cellulose based sheet also increases the permeability of the sheet and thereby reduces its Gurley porosity value. Gurley porosity values are determined using TAPPI Test Method No. T 460 om-96 (1996). Persons skilled in the art will appreciate that these considerations must be weighed when determining synthetic fiber content of a web. For purposes of medical packaging applications, it has been observed that synthetic fiber content over about 30% (based on total dry fiber weight) results in significant loss of strength and ability to control porosity. In one desirable embodiment, synthetic fiber content is between zero and about 10% (based on total dry fiber weight).

Persons skilled in the art are also familiar with several additives that are incorporated into webs during the papermaking process. Examples of such additives include, but are not limited to, wet strength agents, chemicals for pH adjustment, slimicides, sizing agents, drainage aids, defoamers, corrosion inhibitors, fillers, and synthetic polymers. Such additives may be used in different combinations and in different amounts depending upon the process and equipment used to form the sheet. The use of papermaking additives and their purposes are well known and documented in the art.

The refinement of cellulose fibers prior to forming the sheet will impact the final properties of the web. It has been observed that a highly refined sheet that has a Gurley porosity for one ply of between about 20 seconds/100 cc and 120 seconds/100 cc (measured after saturation), and that has a basis weight of about 85 g/m$^2$, provides desirable pathogen barrier characteristics and has desirable permeability to sterilization gases when used in this aspect of the present invention.

Method of Saturating Fibrous Webs

Another element of the invention is the method of saturating the webs. Several methods of impregnating or saturating paper are well known to persons skilled in the art. By way of example and not limitation, saturation methods that are well known include brushing, flooded nip saturation, doctor blading, spraying, and direct and offset gravure coating. The present invention is not limited to any particular application process, and persons skilled in the art will recognize that alternative embodiments are possible with these and other saturation technologies. The amount of saturant or polymer blend applied to the sheet is commonly referred to as percent pickup or add-on. Percent pickup is calculated, on a dry weight basis, by dividing the dry weight of saturant applied by the dry weight of the sheet before saturation and multiplying the result by 100. It has been observed that optimal sealing and barrier properties are achieved for the present invention when pickup values are greater than about 25%. One desirable embodiment uses a pickup value of between about 35% and about 40%. Another desirable embodiment uses a pickup value of between about 40% and about 45%. Still another desirable embodiment uses a pickup value of between about 45% and about 50%. Persons skilled in the art are familiar with methods for designing saturation processes and controlling parameters to achieve a specific pickup value for a given paper.

Embodiments also exist in which the polymer is added to the fibers before the web is formed. This saturation step is performed through addition of the polymer to the "wet end" of a web forming process and is commonly referred to as "wet end deposition" or "latex deposition." The term "wet end" refers to the portions of the web forming process prior to water removal from the fiber mixture; the term "latex" refers to the polymer emulsion. By way of example only, the wet end may refer to any mixing, holding, or refining areas of the process. Alternatively, the wet end may include the forming section just prior to water removal. Examples of wet end deposition may be found in International Publication No. 99/00549 to Kapik et. al., which teaches the use of wet end deposition for improving the strength of a medical packaging paper while maintaining a porous substrate; U.S. Pat. No. 5,466,336 to Kinsley. Jr., which describes a process for coagulating an aqueous polymer into a fiber slurry for the manufacture of a paper-based product.

After saturation, the web may be dried by any method or combination of methods known in the industry. Drying methods include but are not limited to, application of heat to the web by use of convection ovens, radiant heat, infrared radiation, forced air ovens, heated rolls or cans, or other heat sources. Another example of a drying method is allowing the web to air dry without the addition of thermal energy other than that present in the ambient environment.

Packages Comprising Fibrous Webs

The packages that include the saturated web and the method for making the packages are two additional elements of the invention. The packaging will include the saturated web of the present invention and the other component, which is the base component. The base component and saturated web are assembled and sealed using a heat seal device that applies heat to the edges or surfaces of the web and base component in which a seal is desired. Persons skilled in the art will recognize that other components may be incorporated in the package. Examples include, without limitation, internal packaging for protection and separation of components, and labels attached to the package. The amount and type of additional components varies widely and depends on the product packaged and its intended use.

Adhesive Coatings

The adhesive coating that may be used with the saturated paper is also an element of the invention. The adhesive coating can be used in applications where the saturation of the web alone does not provide the desired seal strengths with the selected film. The coating can also be used to decrease the web permeability and thereby increase the bacteria barrier. The coating is comprised of between about 50% and about 85% ethylene vinyl acetate and between about 15% and about 50% ethylene acrylic acid, with both percentages based on the total dry weight of the coating. The relative concentrations of these two compounds will be adjusted to maximize compatibility with the sealant used in the base component. One desirable embodiment uses an ethylene acrylic acid level between about 20 and about 30%, expressed as dry weight. Another desirable embodiment uses an ethylene acrylic acid level of between about 15% and about 20%, expressed as dry weight.

The coating composition may also include additives that provide a coating or coated paper with desirable qualities. Examples include, but are not limited to, crosslinking agents, chemicals for pH adjustment, and surfactants. XAMA® 7, available from Sybron Chemicals is an example of one crosslinking agent. To adjust pH, acids such as hydrochloric acid, sulfuric acid, acetic acid, and oxalic acid, and bases such as ammonia, sodium hydroxide, and potassium hydroxide may be added. Examples of surfactants or dispersing agents include, but are not limited to, TAMOL® 731A available from Rohm & Haas Co., TRITON® X100 available from Union Carbide Corp. and PLURONIC® F104 available from BASF Corporation. Where crosslinking agents are used, they typically are included at levels between about 0.5% and 2.0% (based on the total dry weight of the coating), although other ranges are possible. Levels of pH adjusting compounds typically range up to about 1.0% of the total dry weight of the coating depending on the amount of pH adjustment necessary. Surfactant levels typically range between about 0.5% and about 2.0% of the total dry weight of the coating, although other ranges are possible. Embodiments including coatings with different additives or different quantities of the additives are possible and the present invention is not limited to any particular additive, blend of additives, or relative concentrations.

Several technologies for applying coatings are known in the art including, by way of example and not limitation, rod coating, dip coating, spray coating, gravure coating, knife coating, and slot coating. Persons skilled in the art will recognize that alternative embodiments are possible with these and other coating technologies and the present invention is not limited to any particular application process.

After coating, the web may be dried by any method or combination of methods known in the industry. Drying methods include but are not limited to, application of heat to the web by use of convection ovens, radiant heat, infrared radiation, forced air ovens, heated rolls or cans, or other heat sources. Another example of a drying method is allowing the web to air dry without the addition of thermal energy other than that present in the ambient environment. It is desirable that the web be dried in a manner that prevents contact of the coated side with a heated surface such as the surface of a heated can. It has been observed that direct contact of the coated side to a heated surface may result in partial removal of the coating, an effect sometimes referred to as picking.

The porosity of the finished sheet is greatly affected by the amount and type of coating applied since heavier coatings will cause the paper or fabric to be less permeable to sterilization gases. Heavier coatings will also increase adhesive properties and seal strengths. For a medical packaging substrate it is generally desirable to have a Gurley porosity below about 120 sec/100 cc. Gurley porosity is an indicator of permeability; a higher Gurley porosity value indicates that a sheet has lower permeability to sterilization gases and to pathogens. Sheets with Gurley porosities greater than 120 sec/100 cc may make sterilization difficult due to insufficient permeability to sterilization gases. However, decreasing the Gurley porosity of the sheet also increases the likelihood of penetration by bacteria or other pathogens unless a polymer that improves bacteria barrier is applied, although the minimum Gurley porosity varies depending on composition of the paper and saturant. Furthermore, some coating processes are less capable of applying an effective coat with a low coat weight than others. Selecting a coat weight for a sheet is thus a balance between the capabilities of the coating apparatus used, permeability and porosity to both pathogens and sterilization gases, and the desired seal strength. As examples, coat weights between 3.75 g/m$^2$ and 11.00 g/m$^2$ add-on, on a dry weight basis, have been found to provide the desirable porosity range with webs that have Gurley porosity values below 20 sec/100 cc prior to coating. In embodiments that use dispersed ethylene vinyl acetate powder, persons skilled in the art can use milling of the ethylene vinyl acetate powder to control particle size and thereby control the permeability of the coating to obtain a desired permeability. Larger particle sizes, for example, result in greater permeability.

Thus, the invention relates to a coating that can be used with the saturated webs of the present invention. In one embodiment, the coating comprises a copolymer of ethylene and acrylic acid monomers and a copolymer of ethylene and vinyl acetate monomers. The invention further relates to a fibrous web coated with the coatings of the present invention.

Saturants that Improve Barrier Efficacy

In another aspect, the present invention is a medical packaging material comprising a cellulose-containing substrate web that has been saturated with a latex having a glass transition temperature of −20° C. or less. More specifically, the present invention involves the saturation of the webs with such low-glass transition temperature latexes in order to improve the barrier efficacy of the web.

Conventional latex saturants, when employed at the add-on levels required to obtain the necessary increased strength characteristics, tend to reduce the barrier efficacy of medical packaging substrate webs. It is believed that the efficacy is reduced because the number of tortuous pathways, which entrap microorganisms within the web, are reduced by polymer saturation. The particular latexes having glass transition temperatures of −20° C. and below have been found to actually improve the percent bacterial filtration efficiency ("% BFE") and log reduction value ("LRV"), both common industry determinations of barrier efficacy, of latex-saturated paper as compared to latex-saturated papers that have not utilized these particular latexes.

For example, the latex-saturated webs of this aspect of the present invention will generally exhibit higher % BFEs and LRVs than comparable latex-saturated webs. Generally, the higher the estimated LRV, the greater the bacteria barrier properties. For example, an LRV change from 1 to 2 indicates a ten times improvement in the barrier.

The paper-based webs of this aspect of the present invention may be formed from cellulosic pulp fibers alone, or a mixture of cellulosic pulp and synthetic fibers. The above discussion regarding suitable fibers for heat-sealable papers, as well as the discussion of refinement of such fibers, applies equally to this aspect of the invention.

In making the web of this aspect of the present invention, a pulp furnish is formed according to normal paper-making or web-making procedures. Briefly, and by way of illustration only, the substrate may be made by preparing an aqueous suspension of fibers with at least about 50 percent, by dry weight, of the fibers being cellulosic fibers; distributing the suspension on a forming wire; removing water from the distributed suspension to form a paper; and then treating the paper with the saturant. In general, the aqueous suspension is prepared by methods well known to those having ordinary skill in the art. Similarly, methods of distributing the suspension on a forming wire and removing water from the distributed suspension to form a paper also are well known to those having ordinary skill in the art.

In addition to noncellulosic fibers, the aqueous pulp-containing suspension from which the substrates are made may contain other materials as is well known in the paper-making art. For example, the suspension may contain acids and bases to control pH, such as hydrochloric acid, sulfuric acid, acetic acid, oxalic acid, phosphoric acid, phosphorous acid, sodium hydroxide, potassium hydroxide, ammonium hydroxide or ammonia, sodium carbonate, sodium bicarbonate, sodium dihydrogen phosphate, disodium hydrogen phosphate, and trisodium phosphate; alum; sizing agents, such as rosin and wax; dry strength adhesives, such as natural and chemically modified starches and gums; cellulose derivatives such as carboxymethyl cellulose, methyl cellulose, and hemicellulose; synthetic polymers, such as phenolics, latexes, polyamines, and polyacrylamides; wet strength resins, such as urea-formaldehyde resins, melamine-formaldehyde resins, and polyamides; fillers, such as clay, talc, and titanium dioxide; coloring materials, such as dyes and pigments; retention aids; fiber deflocculants; soaps and surfactants; defoamers; drainage aids; optical brighteners; pitch control chemicals; slimicides; and specialty chemicals, such as corrosion inhibitors, and flame-proofing agents.

In addition to the use of the particular polymers disclosed herein, other binder materials may be used in forming the webs of this aspect of the invention. For example, the additional binder materials may be used as an additional constituent of the saturant in conjunction with the polymers having the specific glass transition temperatures set forth herein. On the other hand, such binder materials may be used at various points in the web-forming or web-saturating process to add additional strength or filtration characteristics to the web.

Any of the latex binders commonly employed for reinforcing paper can be utilized and are well known to those having ordinary skill in the art. Suitable binders include, by way of illustration only, polyacrylates, including polymethacrylates, poly(acrylic acid), poly(methacrylic acid), and copolymers of the various acrylate and methacrylate esters and the free acids; styrene-butadiene copolymers; ethylene-vinyl acetate copolymers; nitrile rubbers or acrylonitrile-butadiene copolymers; poly(vinyl chloride); poly(vinyl acetate); ethylene-acrylate copolymers; vinyl acetate-acrylate copolymers; neoprene rubbers or trans-1,4-polychloroprenes; cis-1,4-polyisoprenes; butadiene rubbers or cis- and trans-1,4-polybutadienes; and ethylene-propylene copolymers.

Specific examples of commercially available latex binders are set forth as examples in Table 1 below:

TABLE 1

| Polymer Type | Product Identification |
| --- | --- |
| Polyacrylates | HYCAR ® 26083, 26084, 26120, 26104, 26106, 26322, 26410, 26469 |
| | Noveon, Inc. |
| | Cleveland, Ohio |
| | Rhoplex ® HA-8, HA-12, HA-16 |
| | NW-1715, B-15 |
| | Rohm and Haas Company |
| | Philadelphia, Pennsylvania |
| | Carboset ® XL-52 |
| | Noveon, Inc. |
| | Cleveland, Ohio |
| Styrene-butadiene copolymers | Butofan ® 4264, 4262 |
| | BASF Corporation |
| | Charlotte, North Carolina |
| | DL 219NA, DL 239NA |
| | Dow Chemical Company |
| | Midland, Michigan |
| Nitrile rubbers | HYCAR ® 1572, 1577, 1570X55, 1562X28 |
| | Noveon, Inc. |
| | Cleveland, Ohio |
| Poly(vinyl chloride) | Vycar ® 352, 552 |
| | Noveon, Inc. |
| | Cleveland, Ohio |
| Ethylene-acrylate copolymers | Michem ® Prime 4990R, 4983R |
| | Michelman, Inc. |
| | Cincinnati, Ohio |
| | Adcote ® 56220 |
| | Rohm & Haas Company |
| | Philadelphia, Pennsylvania |
| Vinyl acetate-acrylate copolymers | Xlink ® 2833 |
| | Vinamul ™ Polymers |
| | Bridgewater, New Jersey |

Various other additives may also be used in forming the bacteria barrier substrate. For example, sizing agents to impart water resistance, wet-strength agents to improve delamination resistance, and other agents may be added either to the furnish or to the formed web. One such exemplary sizing agent is AQUAPEL® 752 available from Hercules Incorporated of Wilmington, Delaware, and one such exemplary wet-strength agent is PAREZ® 631NC available from Cytec Industries, Inc. of West Paterson. N.J. Other agents, include, by way of example only, starches and dry-strength resins which also enhance the physical properties of the web by increasing the delamination resistance of the final product. One such exemplary starch is a cationic potato starch sold under the designation ASTRO® X-200 and one such exemplary dry-strength resin is ACCOS-TRENGTH® 85-PHP, also available from Cytec Industries. Another exemplary dry-strength resin is ACCOS-TRENGTH® 85-3000, also available from Cytec Industries. Cross-linking agents, such as X-LINK® 2833 from Vinamul Polymers and XAMA®7 available from Sybron Chemicals, Inc. of Birmingham, N.J., and/or hydrating agents may also be added to the pulp furnish or to the formed web.

After the web is formed, the web will then be saturated with the polymer emulsion having a glass transition temperature of −20° C. or below. As used herein, the term "saturant" is synonymous with the term "binder" and is meant to include any polymeric material which may be used to bind the fibers of the fibrous web or nonwoven substrate together. The saturant may be applied as either a solution of a polymer in a suitable solvent or as a dispersion of very small polymer particles in a liquid phase, such as water, e.g., as a latex. For example, the saturant may be any of the latex binders commonly employed for reinforcing papers, provided such latex has a glass transition temperature of −20° C. or less. In particular, the acrylic latexes, which are polyacrylates, meeting this glass transition temperature threshold are particularly useful as the saturants for such medical packaging fabrics. In addition, saturant blends comprising more than one latex binder may be employed. In these blended saturant formulations, one or more of the latexes may have a glass transition temperature of greater than −20° C., provided that one or more latexes with glass transition temperatures of −20° C. or less comprise at least 50% of the saturant by dry weight.

Various latex binders are well known to those having ordinary skill in the art and include, by way of illustration only, polyacrylates, including polymethacrylates, poly (acrylic acid), poly(methacrylic acid), and copolymers of the various acrylate and methacrylate esters and the free acids; styrene-butadiene copolymers and carboxylated versions thereof; ethylene-vinyl acetate copolymers; nitrile rubbers or acrylonitrile-butadiene copolymers; poly(vinyl chloride); poly(vinyl acetate); ethylene-acrylate copolymers; vinyl acetate-acrylate copolymers; neoprene rubbers or trans-1,4-polychloroprenes; cis-1,4-polyisoprenes; butadiene rubbers or cis- and trans-1,4-polybutadienes; and ethylene-propylene copolymers.

In particular, the acrylic latexes such as the above-described polyacrylates tend to provide the desired features of the present invention. While other binder systems may provide adequate strength in the latex-saturated webs, the polyacrylate saturants exhibit the most desirable bacterial filtration efficiencies.

The saturation of a fabric is well known in the art and a fabric may be saturated, for example, by spraying the saturant solution onto one or both sides of the web. Saturation of the fabric may also be accomplished by dipping the web into a bath of saturant and removing the excess liquid by passing the web through a nip roller arrangement. Other saturating methods include brushing and doctor blading and the present invention is not limited to any particular saturating process.

If desired, the paper may be dried after the web is formed and prior to treatment of the paper with the saturant. Drying of the paper may be accomplished by any known means. Examples of known drying means include, by way of illustration only, convection ovens, radiant heat, infrared radiation, forced air ovens, and heated rolls or cans. Drying also includes air drying without the addition of thermal energy, other than that present in the ambient environment.

In one particular method of saturating the web, the web is exposed to an excess of saturant and then squeezed so as to control the amount of material added on to the web. The squeezing of excess saturant from the web may be accomplished by passing the web between rollers. In the process, excess, squeezed-out, saturant may be returned to the supply for further use.

After squeezing out excess material to control the saturant add-on, the saturated web may then be dried. Drying may be achieved by passing the fabric around a series of steam heated drums at a temperature appropriate for the particular saturant composition being used. Alternatively, the web material impregnated with saturant can be air-dried.

The web of this aspect of the invention will typically be saturated at an add-on level of from about 10 to about 100 percent, based on the dry weight of the fibrous web. For example, the saturant may be present in the saturated paper at a level of from about 20 to about 70 percent. As another example, the saturant may be present in the saturated paper at a level of from about 30 to about 60 percent.

Saturant total solids in the saturant composition may range from 10 to 60 weight percent, depending on the desired dry saturant pickup. Dry pickup ranges from 10 to 80 dry parts of saturant per 100 dry parts of fibrous web material by weight. Particularly satisfactory ranges of dry pickup are from 20 to 70 dry parts of saturant per 100 dry parts of fibrous web, and saturant total solids in a range of 20 to 50 weight percent in the saturant composition are used. In other embodiments, the dry pickup may be from about 30 to about 50 dry parts, or from about 40 to about 50 dry parts, of saturant per 100 dry parts of fiber in the web. Wet saturant pickup can range from about 40 to about 300 wet parts per 100 parts of fibrous web material by weight.

The expressions "by dry weight," "dry parts," and "based on the dry weight" refer to weights of fibers, e.g., cellulosic fibers, or other materials which are essentially free of water in accordance with standard practice in the papermaking art. When used, such expressions mean that weights were calculated as though no water were present.

A particularly effective saturant may include from about 60 to about 100 percent, on a dry weight basis, of a latex reinforcing polymer (or a blend of latex reinforcing polymers) having a glass transition temperature of −20° C. or less and from about 0 to about 40 percent filler or pigment. Additionally, crosslinking agents, sizing agents, lubricants, antifoaming agents, and acids and bases may comprise about 0 to about 15 percent of the saturant.

After formation of the polymer-impregnated substrate, the fabric is then supplied to a maker of medical packaging. The packaging maker then transforms the fabric into the appropriate packaging necessary for storing medical devices and appliances and surgical instrumentation. Such medical packaging may take the form of sterile wraps for encasing surgical instrument trays, bags, pouches, or other sterilizable containers.

The present invention is further described by the examples that follow. Such examples, however, are not to be construed as limiting in any way either the spirit or scope of the present invention.

EXAMPLES

Embodiments with Improved Heat Sealability

Fibrous webs were saturated with the saturant of the present invention and the heat-sealability of those samples was compared with samples saturated with known saturant polymers.

Example 1

A web saturated with the saturant of the present invention was prepared. The web was formed using ECF bleached kraft eucalyptus pulp available from Votorantim Celulos e Papel SA and a bleached Northern softwood pulp prepared by Kimberly-Clark Corporation and sold under the brand name Longlac 19 or LL19. LL19 pulp is composed of primarily black spruce and jack pine and has a population average fiber length of approximately 1.0 mm and a length weighted average fiber length of approximately 2 mm as determined by TAPPI test method T 271 om-98. The composition of the paper was 69% eucalyptus and 31% softwood based on total dry fiber weight. The pulp also contained PAREZ®607, a wet strength additive manufactured by Cytec Industries, Inc., in an amount of 0.3% based on total dry fiber weight. The pulp was dispersed and refined in an aqueous slurry. A web was then formed on a commercial fine paper machine using a standard Fourdriner table. The web was wet pressed and dried on a series of steam cans prior to saturation.

The web was saturated with a formula comprised of an acrylate polymer and an ethylene acrylic acid emulsion. In the disclosed embodiment, MICHEM® Prime 4983R, a dispersion of ethylene acrylic acid available from Michelman, Inc., was combined with HYCAR® 26703, an emulsion of acrylic polymers available from Noveon, Inc. The ethylene acrylic acid comprised approximately 45.5% of the saturant based on the total dry weight. The acrylate comprised approximately 37.2% of the saturant based on the total dry weight. Other components included in the saturant included TI-PURE®Rutile Titanium Dioxide available from E.I. Du Pont De Nemours & Co. (16.4% by dry weight); NALCO® 7518 antifoaming agent available from Nalco Chemical Company (0.1% by dry weight); NOPCOTE® DC-100A available from Geo Specialty Chemicals, Inc. (0.6% by dry weight); and TAMOL® 731A dispersing agent available from Rohm & Haas Co. (0.2% by dry weight). The desired level of saturant in the web was then achieved by diluting the saturant to between 28% and 32% solids with water.

The saturant was applied to the dried web through flooded nip saturation. The nip consisted of two rolls, one of which rotated through a pan containing the saturation formula. The saturant was applied to the sheet from the bottom roll, which carried the formulation from the pan to the web and from a stream of saturant directed at the intersection of the two rolls and the sheet. The excess saturant was removed by nip pressure and was returned to the supply. The water in the saturant was removed by drying the web on steam heated can dryers, leaving the solids of the formula in the web. With respect to polymer pickup, saturant was added to the paper in an amount between 33% and 40% of the dry weight of the fibers. The web was then calendered in a steel calender prior to testing. The final basis weight of the sample was approximately 98 g/m$^2$.

Comparative Example 2

A web was prepared and saturated using the procedures of EXAMPLE 1 with the exception of fiber selection and saturation formula contents. COMPARATIVE EXAMPLE 2 was prepared from 100% LL19 pulp, a bleached Northern softwood pulp. The web was formed, pressed, and dried in the same process as EXAMPLE 1. The saturation formula for COMPARATIVE EXAMPLE 2 comprised approximately 79% of a saturant of acrylate polymer sold as HYCAR® 26469 by Noveon, Inc. based on the total dry weight. Approximately 20% of the emulsion was TI-PURE® Rutile Titanium Dioxide; additives such as dispersing agents (0.1%), antifoam agents (0.01%), and process aids (0.89%) were also used. The desired level of saturant in the web was then achieved by diluting the saturant to between 28% and 32% solids with water. The dry add-on of the saturant was between 45% and 50% of the dry weight of the fibers. All percentages expressed above were in dry weight. The web was saturated and finished in a similar manner to EXAMPLE 1. The final basis weight of COMPARATIVE EXAMPLE 2 was approximately 114 g/m$^2$.

Comparative Example 3

A web was prepared and saturated using the procedures of EXAMPLE 1 with the exception of fiber selection, saturation formula contents, and method of saturation. COMPARATIVE EXAMPLE 3 was prepared with 78% LL19, a bleached Northern softwood pulp, and 22% LL16, a bleached Northern hardwood pulp. The web was formed, pressed, and dried in a similar manner as EXAMPLE 1. However the web was saturated in a laboratory on a bench scale. The saturation formula used for COMPARATIVE EXAMPLE 3 comprised approximately 83% acrylate polymer sold as HYCAR® 26769, an emulsion containing acrylic polymers available from Noveon, Inc. and approximately 17% TI-PURE® Rutile Titanium Dioxide as an additive for color. A dispersing agent was present in less than 0.1%. All percentages expressed above were in dry weight. The total solids of the formula were reduced to approximately 35% with water.

With respect to polymer pickup, saturant was added to the paper in an amount equal to approximately 46% of the dry weight of the fibers. The rate of polymer add-on was adjusted by controlling nip pressure through adjustments to the force on the top roll and through dilution of the saturation formula discussed above. The force was adjusted by moving an eight pound weight along each of the two lever arms supported by the top roll. After saturation, the wet sheet was dried on a steam heated can dryer. The final basis weight of COMPARATIVE EXAMPLE 3 was approximately 85 g/m$^2$.

Comparative Example 4

A web was prepared and saturated using the procedures of COMPARATIVE EXAMPLE 3 with the exception of saturation formula contents. COMPARATIVE EXAMPLE 4 was saturated with a formula comprising approximately 83% ethylene vinyl chloride polymer sold as AIRFLEX® 4530 and approximately 17% TI-PURE® Rutile Titanium Dioxide. A dispersing agent was present in less than 0.1%. All percentages expressed above were in dry weight. The total solids of the formula were reduced to between 28% and 35% with water. The dry polymer add-on was approximately 44%. The final basis weight of COMPARATIVE EXAMPLE 4 was 84 g/m$^2$.

Comparative Example 5

A web was prepared and saturated using the procedures of COMPARATIVE EXAMPLE 3 with the exception of saturation formula contents. COMPARATIVE EXAMPLE 5 was saturated with a formula comprising approximately 83% by weight of a vinyl acetate homopolymer sold as VINAC® XX-211 and approximately 17% TI-PURE® Rutile Titanium Dioxide. A dispersing agent was present in less than 0.1%. The total solids of the formula were reduced to between 30% and 35% with water. All percentages expressed above were in dry weight. The dry polymer add-on was approximately 40%. The final basis weight of COMPARATIVE EXAMPLE 5 was 82 g/m$^2$.

Comparative Example 6

A web was prepared using the procedures of EXAMPLE 1 with the exception of fiber selection, saturation formula contents, and method of saturation. COMPARATIVE EXAMPLE 6 was prepared with 69% VCP Eucalyptus, a bleached Eucalyptus pulp, and 31% LL19, a bleached Northern softwood pulp. The web was formed, pressed, and dried in a laboratory on a bench scale. The web was then saturated using the procedures in COMPARATIVE EXAMPLE 3 with the exception of saturant formula contents and add-on. The saturation formula used for COMPARATIVE EXAMPLE 6 comprised approximately 83% acrylate polymer sold as HYCAR® 26703 and approximately 17% TI-PURE® Rutile Titanium Dioxide. A dispersing agent was present in less than 0.1%. All percentages expressed above were in dry weight. The total solids of the formula were reduced to approximately 30% with water. The dry polymer add-on was approximately 42%. The final basis weight of COMPARATIVE EXAMPLE 6 was approximately 99 g/m$^2$.

The sealing properties of the saturated webs of EXAMPLE 1 and COMPARATIVE EXAMPLES 2–6 were evaluated by sealing the webs to various flexible base components, referred to herein as "films." Each film contained a base component material as that term is defined herein. The seals were generated using a Model # 12AS laboratory heat sealer manufactured by Sentinel Packaging Industries of Hyannisport, Massachusetts. The heat sealer is equipped with two platens, or jaws, measuring 1" wide by 12" long. The top jaw was heated and could be applied to the bottom jaw under pressure. Portions of each saturated web that were approximately 4" long and 2" wide were sealed to portions of films that were approximately 4" long and 1.25" wide. The films used each had most of their base component materials distributed on only one face (side) of the films. Accordingly, the films would be expected to seal on only one side, so they were placed between two layers of the saturated web (paper) such that a layer of paper was in contact with each side of the film and each platen. A seal temperature of 350° F. was used for sealing with a pressure of 55 psi. The time the films and webs were held together in the jaw, or dwell time, ranged between about 1.7 and about 3.5 seconds dwell time depending on the time required to activate the film sealant at 350° F. During sealing, the film adhered to the layer of paper placed on the base component material side. The other layer of paper was removed and discarded. Each sealed sample, comprising one layer of paper and one layer of film, was allowed to condition overnight at 22–24° C. and 48–52% relative humidity prior to testing.

The seal strength was tested by measuring the force required to separate the two layers in a T-peel test. All T-peel tests in this application were performed using ASTM method F904-98 with the following changes: sample width was 15 mm, jaw travel was 125 mm at a rate of 300 millimeters per minute. The separation was started manually to a length of approximately 1." Once separated, the sealed sample was cut down to 15 mm width, retaining the original length. The film layer was placed in the upper jaw of a constant rate of elongation tester, an INSTRON® 5500R available from Instron Corporation. The paper layer was placed in the lower jaw with a 1" separation between the two jaws. The lower jaw remained stationary while the upper jaw moved vertically at approximately 300 millimeters per minute. The upper jaw moved 125 millimeters before the test was completed. During the test, the free portion of the sample was manually supported at 90° from the jaws. The force required to continue the separation, or peel, was averaged for the duration of the test to result in the seal strength per 15 mm width. The value generated from the test was in grams force/15 mm. The values were converted to pounds force/inch, a more common unit of measure in the packaging industry.

As used in Table 2, "Sealing Temperature" refers to the temperature of the heated platen, expressed in degrees Fahrenheit. "Sealing Pressure" refers to the pressure applied to the seal, expressed in pounds per square inch. "Dwell Time" refers to the duration of time in the seal, expressed in seconds.

Different samples were prepared by sealing each type of saturated web to each type of film. The same conditions were used for each sample involving the same film type (e.g., all samples generated using Pliant X3-451-819.0 as a film were generated with the same sealing conditions). The sealing conditions used can be seen in Table 2. The sealing conditions developed were those that were found to be optimal with EXAMPLE 1. Optimal conditions were those in which a seal formed that was as strong as possible without exceeding the strength of the internal bond of the paper. Exceeding the internal bond of the paper results in the paper delaminating and a tear occurring between layers of paper rather than in the seal.

TABLE 2

Conditions for Seal Strength Testing

| Film | Sealing Temperature (° F.) | Sealing Pressure (psi) | Dwell Time (sec) |
| --- | --- | --- | --- |
| Pliant X3-451-819.0 | 350 | 55 | 3.5 |
| Pliant X5-539-169.3 | 350 | 55 | 1.7 |
| RJR PD6260 | 350 | 55 | 2.1 |
| Winpak WH2021-55 CA20088C | 350 | 55 | 1.7 |

Seal strength results, in lb/inch, for each sample with the above films at the above conditions can be found in Table 3. Seal strength refers to the force required to separate the film from the sample using a T-peel test pursuant to the ASTM method.

EXAMPLE 3. The paper was prepared and saturated using the procedures of COMPARATIVE EXAMPLE 3, with the exception of saturation formula content. Various combinations of an acrylic polymer (HYCAR® 26703) and an ethylene acrylic acid polymer (MICHEM Prime® 4983R) were used. COMPARATIVE EXAMPLE 7 contained 100% ethylene acrylic acid polymer based on total dry weight of the combined polymers. EXAMPLE 8 contained 75% acrylic polymer and 25% ethylene acrylic acid based on total dry weight of the combined polymers. EXAMPLE 9 contained 50% acrylic polymer and 50% ethylene acrylic acid based on total dry weight of the polymers. EXAMPLE 10 contained 25% acrylic polymer and 75% ethylene acrylic acid based on total dry weight of the polymers. COMPARATIVE EXAMPLE 11 contained 100% acrylic polymer based on total dry weight of the polymers.

Seals were made with the films and under the conditions set forth in Table 2. Seal strength was determined using the same procedures and for the same films as the tests performed for EXAMPLE 1. Seal strength results, in lb/inch,

TABLE 3

Seal strengths for Example 1 and Comparative Examples 2–6 (lb/inch)

| Film | EXAMPLE 1 | Comparative EXAMPLE 2 | Comparative EXAMPLE 3 | Comparative EXAMPLE 4 | Comparative EXAMPLE 5 | Comparative EXAMPLE 6 |
| --- | --- | --- | --- | --- | --- | --- |
| Pliant X3-451-819.0 | 0.717 | 0.094 | not tested | not tested | not tested | 0.096 |
| Pliant X5-539-169.3 | 1.022 | 0.033 | 0.068 | 0.060 | 0.050 | 0.037 |
| RJR PD6260 | 0.825 | 0.053 | 0.029 | 0.029 | 0.132 | 0.044 |
| Winpak WH2021-55 CA20088C | 0.646 | 0.012 | not tested | not tested | not tested | 0.029 |

EXAMPLES 7–11 were prepared using a paper with the same fiber composition as used in COMPARATIVE for each sample with the above films at the above conditions can be found in Table 4.

TABLE 4

Seal strengths for Examples 8–10 and Comparative Examples 7 and 11 (lb/inch)

| Film | COMPARATIVE EXAMPLE 7 | EXAMPLE 8 | EXAMPLE 9 | EXAMPLE 10 | COMPARATIVE EXAMPLE 11 |
| --- | --- | --- | --- | --- | --- |
| Pliant X3-451-819.0 | 0.705 | 0.960 | 0.827 | 0.681 | 0.327* |
| Pliant X5-539-169.3 | 0.871 | 0.953 | 1.173 | 0.626 | 0.032 |
| RJR PD6260 | 0.641 | 0.743 | 0.556 | 0.380 | 0.033 |
| Winpak WH2021-55 CA20088C | 0.734 | 0.664 | 0.589 | 0.480 | 0.044 |

*A retest of COMPARATIVE EXAMPLE 11 with Pliant X3-451-819.0 provided a seal strength of 0.270.

Although the 100% EAA in COMPARATIVE EXAMPLE 7 showed a lower seal strength for all films than the 75% EAA/25% acrylic polymer in EXAMPLE 8, this is believed to be because pickup levels of saturant were lower. The preferred pickup level is greater than 25% and more desirably greater than 30%. Increasing the pickup improves strength properties such as internal bond, but also ensures that sufficient polymer is applied to the web surface and fiber network to achieve adequate adhesion to the base component material. Specifically, pickup levels were 24.5% for COMPARATIVE EXAMPLE 7, 30.7% for EXAMPLE 8, 41.1% for EXAMPLE 9, 42.7% for EXAMPLE 10, and 39.4% for EXAMPLE 11.

Drapability of the Webs Saturated with the Invention

Drapability was compared using two different methods. First, the Persoz or Rocker hardness test was used to evaluate the samples. Tests used Test Method B of American Society for Testing and Material (ASTM) Method No. D4366-95, except that samples were conditioned for four hours rather than 16 hours. Equipment was a Persoz pendulum on a rocker hardness tester manufactured by Thomas Scientific located in Swedesboro, N.J. (U.S. Ser. No. 5,976, 870). Average (mean) values were determined based upon measurements for ten samples. Results are presented in Table 5. Values are expressed in seconds as specified in the method.

TABLE 5

| Example | Mean hardness (seconds) |
| --- | --- |
| COMPARATIVE EXAMPLE 7 | 74 |
| EXAMPLE 8 | 67 |
| EXAMPLE 9 | 64 |
| EXAMPLE 10 | 54 |
| COMPARATIVE EXAMPLE 11 | (not tested) |

Gurley stiffness was also determined for EXAMPLES 7–11 using TAPPI Method No. T543om-00 in the machine direction (MD) and cross direction (CD), using a 2.0" wide×2.5" long sample and the 5 g weight in the 2" position. Equipment used was a Gurley Stiffness Tester from Gurley Precision Instruments located in Troy, N.Y. (model number 4171-D and serial number 956341). The Gurley stiffness values (expressed in milligrams) for each of the samples can be seen in TABLE 6.

TABLE 6

| | Gurley Stiffness, MD (mg) | Gurley Stiffness, CD (mg) |
| --- | --- | --- |
| COMPARATIVE EXAMPLE 7 | 169.7 | 100.6 |
| EXAMPLE 8 | 143.9 | 102.1 |
| EXAMPLE 9 | 144.3 | 99.1 |
| EXAMPLE 10 | 143.9 | 93.5 |
| COMPARATIVE EXAMPLE 11 | 117.7 | 75.7 |

Example 12

Saturated webs are prepared according to the procedures of EXAMPLE 1 except that a different saturant blend is used. Saturants are prepared as follows. An aqueous dispersion with 30% total dry solids is prepared that contains 99% by dry weight MICROTHENE® F FN501-11, a fine particle polyethylene powder, and 1% by dry weight TRITON® X-100. The solution is milled using a Tri-Homo® Colloid Mill, model number 2.5 serial number 1739, sold by Sonic Corporation of Stratford, Conn. The solution is cycled through the colloid mill multiple times, each time at a lower gap setting, beginning at approximately 15 and ending at 3 or 4. After two to three cycles at the final gap setting, the solution is collected from the colloid mill. Once milled, the dispersion is mixed with an emulsion of an acrylate polymer in a variety of amounts to prepare saturants. One set of saturants is prepared in which the MICROTHENE® dispersion is mixed with HYCAR® 26083 available from Noveon, Inc. Another group of saturants is prepared by mixing the MICROTHENE® dispersion with RHOPLEX®B-15 from Rohm & Haas. Mixes with each acrylate emulsion are prepared in the percentages below in Table 7. All percentages are based on total dry weight of the component. Where additives are used, the additives include: processing aids (for example NOPCOTE® DC-100A to prevent buildup on converting slitters) in amounts up to 1%, dispersing aids (for example, TRITON®X-100 or TAMOL® 731A to avoid separation of saturant components) in amounts up to 2%, fillers (for example TI-PURE® Rutile Titanium Dioxide or kaolin clay to increase opacity) in amounts up to 8%, and chemicals for pH adjustment (for example ammonia), where necessary to obtain a final saturant pH in the desirable range between 7.5 and 8.5. All percentages are based on dry weight.

TABLE 7

| % Polyethylene dispersion (by weight) | % Acrylate emulsion (by weight) | % Additives (by weight) |
| --- | --- | --- |
| 60 | 40 | 0 |
| 55 | 40 | 5 |
| 55 | 45 | 0 |
| 50 | 40 | 10 |
| 50 | 45 | 5 |
| 50 | 50 | 0 |
| 45 | 45 | 10 |
| 45 | 50 | 5 |
| 40 | 50 | 10 |

The saturant is then applied to a paper using the procedures set forth in EXAMPLE 1 and is otherwise processed as set forth in EXAMPLE 1.

Increasing Seal Strength through Coating

Example 13

A web was prepared in a similar fashion to EXAMPLE 1 with the exception of fiber selection and saturation formula contents. EXAMPLE 13 was prepared from 78.4% LL19 pulp, a bleached Northern softwood pulp and 21.6% LL16 pulp. The web was formed, pressed, and dried in the same process as EXAMPLE 1. The saturation formula for EXAMPLE 13 comprised approximately 41.4% ethylene acrylic acid and 41.4% acrylate polymer based on the total dry weight. Approximately 16.5% of the saturant was Ti-Pure® Rutile Titanium Dioxide; additives included dispersing agents (0.09% TAMOL® 731A), antifoam agents, (0.01% NALCO® 7518), and process aids, (0.6% NOPCOTE® DC-100A). All percentages expressed above were based on dry weight. The desired level of saturant in the web was then achieved by diluting the saturant to between 28% and 35% solids with water. The dry add-on of the saturant was between 42% and 48% of the dry weight of the fibers.

The web was saturated and finished in a similar manner to EXAMPLE 1. After finishing, the web was coated with a formula comprising 78.2% MICROTHENE® F FE532, an ethylene vinyl acetate powder available from Equistar Chemicals L.P. and 19.5% MICHEM® Prime 4983R an ethylene acrylic acid emulsion. Additives were XAMA® 7 available from Sybron Chemicals, a crosslinking agent (1.2%), ammonia for pH adjustment (0.3%), and TRITON® X100, a dispersing agent Union Carbide Corp. (0.8%). The formula solids were adjusted to between 30% and 34% with water. All percentages expressed above were based on dry weight. The coating was applied to the web with a transfer roll which rotated in a pan of coating formula. Excess coating formula was metered off using a wire tightly wound around a steel rod (commonly known as a Meyer rod). A #18 Meyer rod was used. The coat weight was approximately 9 g/m2. The final basis weight was approximately 93 g/m2. After coating, the sheet was dried in an oven at between 120 and 170° C. until the sheet was determined to be dry.

Seals were made with the films and under the conditions set forth in Table 2. Seal strength was determined using the same procedures and for the same films as the tests performed for EXAMPLE 1. Seal strength results, in lb/inch, for each sample with the above films at the above conditions can be found in Table 8. The results demonstrate that the coating significantly increases the seal strength.

TABLE 8

Seal strengths for Example 13 (lb/inch)

| Film | EXAMPLE 13 |
| --- | --- |
| Pliant X3-451-819.0 | ** |
| Pliant X5-539-169.3 | 2.013 |
| RJR PD6260 | 1.512 |
| Winpak WH2021-55 | ** |
| CA200 88C | |

**Seal strength exceeded internal bond of paper such that paper delaminated and tear occurred between layers of paper rather than in the seal.

Enhancement of Bacteria Filtration Efficiency

The Examples were performed in order to demonstrate the bacteria filtration efficiency enhancement in fibrous structures. Various papers were saturated with latex compositions having various glass transition temperatures. The particular latexes were added-on at a rate of from about 30 to about 50 dry parts per 100 dry parts fiber in each case. Table 9 below indicates, with respect to each Example, the basis weight of the paper, a description of the paper composition and saturating emulsion composition, the glass transition temperature of the saturant, the Gurley Porosity (which indicates the porosity or permeability of the sheet), the Bacteria Filtration Efficiency (% BFE) and the Log Reduction Value ("LRV") (for some of the samples only).

Each of the samples was prepared by blending and refining the indicated amounts of cellulosic fibers in an aqueous slurry. Noncellulosic fibers, if used, were added to the slurry after refining. The fiber slurries were then deposited on a forming fabric or wire and the water was removed. The resulting formed web was dried prior to treatment by polymer emulsion. The polymer emulsion was applied in each case by exposing the web to an excess of saturant in a flooded nip. The excess material was removed in the nip. The saturated sheet was then dried and steel-calendered at about 150 pounds per linear inch ("PLI") prior to testing.

The porosity of the saturated sheets was determined according to the Gurley Hill Porosity test pursuant to TAPPI Test Method T460om-96. The basis weight was determined by TAPPI Test Method T410om-98 and is reported in grams per square meter.

The Bacterial Filtration Efficiency ("BFE") of the saturated substrates was determined by employing a ratio of the bacterial challenge counts to sample effluent counts, which yields the percent bacterial filtration efficiency ("% BFE"). The BFE test described below was performed by Nelson Laboratories (Salt Lake City, Utah). A culture of Staphylococcus aureus was diluted in 1.5% peptone water to a precise concentration to yield challenge level counts of 2200±500 colony forming units ("CFU") per test sample. The bacterial culture suspension was pumped through a nebulizer at a controlled flow rate and fixed air pressure. The constant challenge delivery, at a fixed air pressure, formed aerosol droplets with a mean particle size ("MPS") of approximately 3.0 microns. The aerosol droplets were generated in a glass aerosol chamber and drawn through a six-stage, viable particle, Andersen sampler for collection. The collection flow rate through the test sample and Andersen sampler was maintained at 28.3 LPM (1 CFM). Test controls and test samples were challenged for a two-minute interval.

The delivery rate of the challenge also produced a consistent challenge level of 2200±500 CFU on the test control plates. A test control (no filter medium in the airstream) and reference material are included after 7–10 test samples. The Andersen sampler, a sieve sampler, impinged the aerosol droplets onto six agar plates based on the size of each droplet. The agar medium used was soybean casein digest agar (SCDA). The agar plates were incubated at 37° C.±2° C. for 48 hours±4 hours, with shaking, and the colonies formed by each bacteria-laden aerosol were droplet counted and converted to probable hit values using the hole conversion chart provided by Andersen. These converted counts were used to determine the average challenge level delivered to the test samples. The distribution ratio of colonies for each of the six agar plates were used to calculate the MPS of the challenge aerosol.

The filtration efficiencies were calculated as a percent difference between test sample runs and the control average using the following equation:

$$\frac{C-T}{C} \times 100 = \% \ BFE$$

Where:
  C=Average of control values; and
  T=Count total for test material.
The measurement, % BFE, has an upper limit of 100%, indicating 100% of the microorganisms were intercepted by the test material.

Bacteria Spore Penetration is measured according to ASTM F 1608-95. According to this test method, a sheet sample is exposed to an aerosol of Bacillus subtilis var. niger spores for 15 minutes at a flow rate through the sample of 2.8 liters/minute. Spores passing through the sample are collected on a media and are cultured and the number of colony-forming units ("CFU") is measured. The log reduction value ("LRV") expresses the difference, measured in log scale, between the number of CFU on the control media and the number of CFU on the media that was behind the sample. This ability to resist passage of microorganisms is calculated according to the following equation:

$LRV = \log_{10} N_0 - \log_{10} N_1$

Where:
  $N_0$=average bacterial challenge determined from the challenge control filter, CFU; and
  $N_1$=average number of bacteria passing through Test Sample 1, CFU. If $N_1 < 1$, then LRV is expressed as $> \log_{10} N_0$.

For example, an LRV of 5 represents a difference of 100,000 cluster forming units. The range of measurable LRV is 0 to 5, where a greater number indicates the likelihood of greater barrier efficacy (as measured by this test). Ethox Corporation performed the LRV determinations.

TABLE 9

| EXAMPLE | Basis Weight (g/m²) | Description of Paper Fibers and Saturant Composition | Glass Transition Temperature (° C.) | Gurley Porosity (sec/100 cc) | % BFE | LRV |
|---|---|---|---|---|---|---|
| 14 | 84.6 | High porosity base comprised of 78.4% Northern ("N.") softwood fiber, 21.6% hardwood fiber, saturated with RHOPLEX B-15 acrylic polymer | −5 | 6 | 81 | 1.3 |
| 15 | 84.6 | High porosity base comprised of 78.4% N. softwood fiber, 21.6% hardwood fiber, saturated with HYSTRETCH ® V-29 acrylic polymer | −29 | 9 | 93.1 | |
| 16 | 84.6 | High porosity base comprised of 78.4% N. softwood fiber, 21.6% hardwood fiber, saturated with HYSTRETCH ® V-43 acrylic polymer | −43 | 7 | 96.2 | 1.7 |
| 17 | 114 | Low porosity base comprised of 56.5% N. softwood fiber, 43.5% eucalyptus fiber, saturated with RHOPLEX B-15 acrylic polymer | −5 | 20 | 97.7 | |
| 18 | 114 | Low porosity base comprised of 56.5% N. softwood fiber, 43.5% eucalyptus fiber, saturated with HYSTRETCH ® V-43 acrylic polymer | −43 | 15 | 99.9 | |
| 19 | 73.3 | High porosity base comprised of 60.3% eucalyptus fiber, 29.7% N. softwood fiber, 10% low density polyethylene/polypropylene ("LDPE/PP") fiber, saturated with HYSTRETCH ® V-43 | −43 | 2 | 97.4 | |
| 20 | 84.5 | High porosity base comprised of 60.3% eucalyptus fiber, 29.7% N. softwood fiber, 10% LDPE/PP fiber, saturated with HYCAR 26084 acrylic polymer | 8 | 8 | 88 | |
| 21 | 84.5 | High porosity base comprised of 60.3% eucalyptus fiber, 29.7% N. softwood fiber, 10% LDPE/PP fiber, saturated with HYCAR 26410 acrylic polymer | −11 | 8.6 | 90 | |
| 22 | 84.5 | High porosity base comprised of 60.3% eucalyptus fiber, 29.7% N. softwood fiber, 10% LDPE/PP fiber, saturated with HYCAR 26703 acrylic polymer | −15 | 11.7 | 92.8 | |
| 23 | 84.5 | High porosity base comprised of 60.3% eucalyptus fiber, 29.7% N. softwood fiber, 10% LDPE/PP fiber, saturated with RHOPLEX B15 acrylic polymer | −5 | 7.5 | 90.4 | |
| 24 | 84.5 | High porosity base comprised of 78.4% N. softwood fiber, 21.6% hardwood fiber, saturated with HYSTRETCH ® V-43 acrylic polymer | −43 | 8 | 96.9 | |

As can be seen in Table 10, the acrylic polymers sold under the "HYSTRETCH®" tradename are particularly useful in forming the medical packaging substrate of the present invention. In particular, where the Gurley Hill porosity is high (such as 15 sec/100 cc), the use of a HYSTRETCH® acrylic polymer saturant having a glass transition temperature of −20° C. or less can result in a highly efficient bacterial filtration fabric.

The various HYSTRETCH® polymers employed in the Examples above have the following characteristics indicated in Table 7:

TABLE 10

| Acrylic Polymer | Total Solids (%) | pH | Viscosity (cP) | Glass Transition Temperature (° C.) | Specific Gravity |
|---|---|---|---|---|---|
| HYSTRETCH ® V-60 | 50 | 8.0 | 40 | −60 | 1.01 |
| HYSTRETCH ® V-43 | 50 | 8.0 | 200 | −43 | 1.03 |
| HYSTRETCH ® V-29 | 49 | 8.0 | 70 | −29 | 1.04 |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims. Therefore, the spirit and scope of the appended claims should not be limited to the description of the preferred versions contained therein.

What is claimed is:

1. A fibrous web, the fibrous web being saturated with a composition comprising a blend of a latex polymer having a glass transition temperature of 10° C. or less and a heat-sealable polymer comprising a homopolymer or heteropolymer of a lower alkene, wherein the fibrous web has a Gurley stiffness of less than about 165 milligrams in the machine direction and a seal strength of at least about 0.70 pound per inch when sealed to a base component.

2. The fibrous web of claim 1, wherein the Gurley stiffness of the fibrous web is less than about 145 milligrams in the machine direction.

3. The fibrous web of claim 1, wherein the Gurley stiffness of the fibrous web is less than about 100 milligrams in the cross direction.

4. The fibrous web of claim 1, wherein the latex polymer is an acrylic polymer.

5. The fibrous web of claim 1, wherein the heat-sealable polymer comprises polyethylene, polypropylene, ethylene acrylic acid, ethylene vinyl acetate, or combinations thereof.

6. The fibrous web of claim 1, wherein the fibrous web includes cellulosic fibers.

7. The fibrous web of claim 1, wherein the percent add-on of the composition is at least about 25%.

8. The fibrous web of claim 1, wherein the fibrous web has a Gurley porosity of less than about 120 seconds per 100 cubic centimeters.

9. A fibrous web, the fibrous web containing cellulosic fibers and being saturated with a composition comprising a blend of an acrylic latex polymer and a homopolymer or heteropolymer of a lower alkene, wherein the fibrous web has a Gurley stiffness of less than about 145 milligrams in the machine direction and a seal strength of at least about 0.70 pound per inch when sealed to a base component.

10. The fibrous web of claim 9, wherein the Gurley stiffness of the fibrous web is less than about 100 milligrams in the cross direction.

11. The fibrous web of claim 9, wherein the acrylic latex polymer has a glass transition temperature of about 10° C. or lower.

12. The fibrous web of claim 9, wherein the heat-sealable polymer comprises polyethylene, polypropylene, ethylene acrylic acid, ethylene vinyl acetate, or combinations thereof.

13. The fibrous web of claim 9, wherein the percent add-on of the composition is at least about 25%.

14. The fibrous web of claim 9, wherein the fibrous web has a Gurley porosity of less than about 120 seconds per 100 cubic centimeters.

15. A fibrous web, the fibrous web containing cellulosic fibers and being saturated with a composition comprising a blend of an acrylic latex polymer and a heat-sealable polymer selected from the group consisting of polyethylene, polypropylene, ethylene acrylic acid, ethylene vinyl acetate, and combinations thereof, the percent add-on of the composition being at least about 25%, wherein the fibrous web has a Gurley stiffness less than about 165 milligrams in the machine direction, a Gurley porosity of less than about 120 seconds per 100 cubic centimeters, and a seal strength of at least about 0.70 pound per inch when sealed to a base component.

* * * * *